March 9, 1943. J. HIRSCHBERGER 2,313,146
METHOD FOR RECLAIMING OR REGENERATING RUBBER FROM RUBBER WASTE PRODUCTS
Filed Nov. 20, 1940
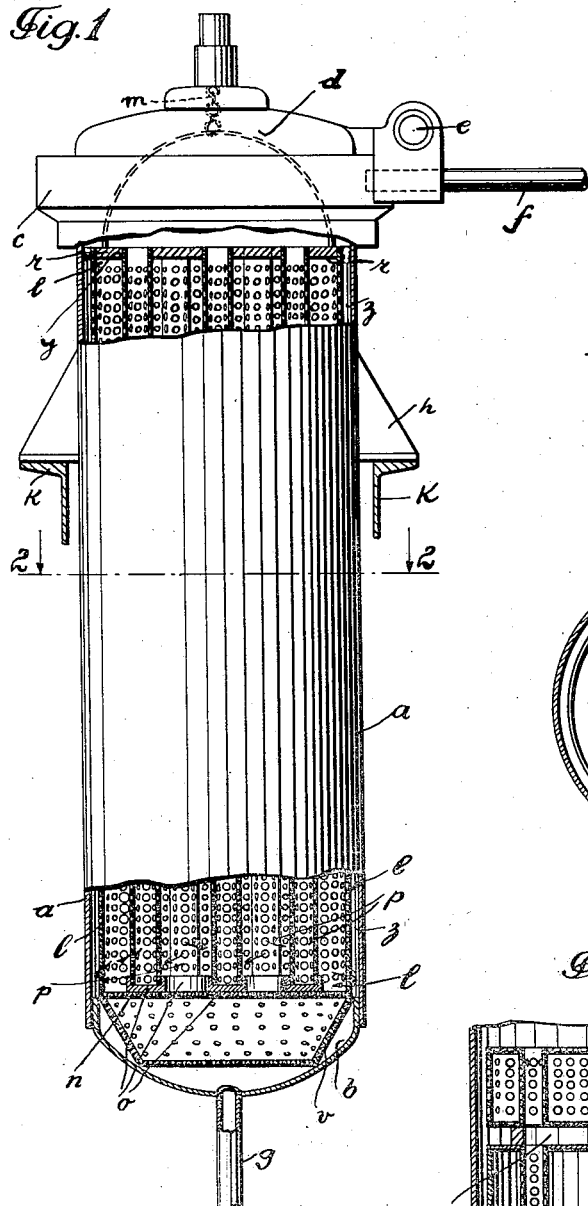
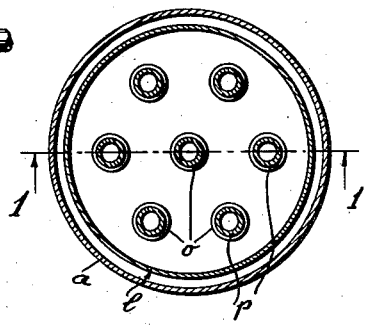
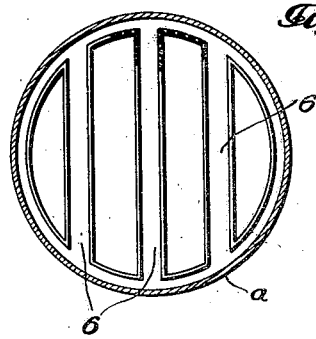
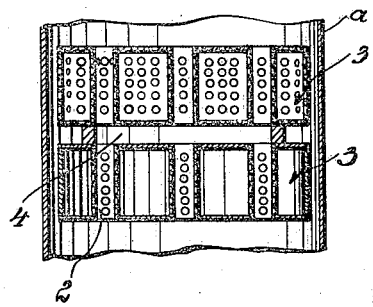
INVENTOR:
Jakob Hirschberger
BY
ATTORNEY.

Patented Mar. 9, 1943

2,313,146

UNITED STATES PATENT OFFICE 2,313,146

METHOD FOR RECLAIMING OR REGENERATING RUBBER FROM RUBBER WASTE PRODUCTS

Jakob Hirschberger, New York, N. Y.

Application November 20, 1940, Serial No. 366,408

1 Claim. (Cl. 260—720)

This invention relates to a method for reclaiming or regenerating rubber from rubber waste products.

The methods hitherto used for this purpose are chiefly based on the application of alkaline and other solvents; these methods are complicated and involve, as generally known, considerable losses of up to 35% of the rubber. The treating period runs up to approximately 35 hours.

It has also been suggested to subject the rubber waste goods to a reclaiming treatment with steam at comparatively low pressure and for periods of several days. In order to shorten the treating period high-pressure steam methods have been devised involving a correspondingly high treating temperature. Hereby the treating period has been reduced to less than one hour.

In order to obtain a most complete devulcanisation of the waste rubber products it has been hitherto considered essential to disintegrate or to break-up the rubber waste goods by a shredding or by an otherwise comminuting procedure and to hereby reduce the same to relatively small particles of a practically uniform size. These particles were then charged into an autoclave and subjected to the action of high pressure steam.

The outstanding drawback of this procedure is the unequal distribution of the steam within the charge and its uneven action on the charged goods. A further disadvantage resulted from a premature compression of a part of the waste rubber pieces by the steam into a more or less coherent mass before there was sufficient time given to the steam to act upon the charge; consequently, large portions of the same remained incompletely devulcanized.

The high-pressure steam method, therefore, proved to be uneconomic and the rubber waste reclaiming methods based on this working principle have not obtained practical importance.

Needless to state that the preliminary mechanical disintegration of the waste rubber articles greatly increased the costs of the treatment.

In view of these deficiencies the present invention is based on the recognition that instead of mechanically pretreating the waste rubber articles the introduction of the high-pressure steam or other devulcanizing agents into the charge must be controlled in such a manner as to provide access to the entire surface of the rubber waste articles.

Therefore, it is the main object of this invention to introduce the devulcanizing agent and particularly the high-pressure and preferably saturated steam into the reaction receptacle or autoclave in such a manner that the agent is uniformly distributed throughout the entire charge.

It is a further object of the invention to charge the waste rubber articles into the treating receptacle in their original and unchanged state.

It is a further object of the invention to regulate the entry of the high-pressure steam or other devulcanizing agents into the autoclave in such manner that the rubber waste articles are acted upon by the steam substantially on their entire surface.

Another object of this invention is to control the supply to the autoclave of the uniformly distributed steam or other devulcanizing agent with regard to pressure and time of treatment in accordance with the quality of the rubber waste articles to be reclaimed.

It is also an object of the invention to prevent the premature clogging together by the high-pressure steam of outer portions of the charge or the formation of an outer crust which prevents the penetration of the steam into the inner portions of the charge.

It is another important object to reduce the manufacturing costs to a minimum and to produce a completely devulcanized and thoroughly uniform rubber mass.

The invention makes it also possible to reclaim the rubber from synthetic waste rubber articles which hitherto has not been achieved by any known rubber regenerating method.

With these and other objects in view which will be apparent as this description proceeds, an apparatus for carrying out this invention is illustrated by way of example in the attached drawing of which Fig. 1 is a general view of the apparatus in part-sectional elevation, Fig. 2 is a cross section according to line 2—2 of Fig. 1, Fig. 3 illustrates a second form of the charging and treating vessel, Fig. 4 shows a further modification of the steam distributing equipment.

The treating receptacle which is built on the lines of a customary autoclave consists of a cylinder $a$, a base part $b$ and a top part $c$. A cover $d$ is provided to tightly close the inner space of the autoclave. This cover is rotatable about pivot $e$ which latter is supported by top part $c$.

The steam is introduced into the inner space of the autoclave through tube $f$ and is discharged from the bottom section $b$ through tube $g$. Brace members $h$ are fastened to the cylinder $a$ and the autoclave is supported thereby on a carrying structure $k$.

A cylindrical charging vessel $l$ serves for the reception of the waste rubber goods. This vessel is suspended from a chain $m$ and may be inserted in the autoclave or lifted therefrom by a crane (not shown); it is provided with a bottom plate $n$; the cylinder wall and the bottom plate $n$ are perforated. Cups $o$ are located on bottom plate $n$ of the charging vessel for the reception of perforated tubes $p$. These tubes are uniformly distributed within the charging vessel $l$, as shown in Fig. 2 in such a manner that steam paths of substantially equal lengths are created within the charge. The vessel $l$ is preferably closed at the top by a plate $r$ which is provided with orifices $y$ in which the tubes $p$ project. However, this cover $r$ may be omitted without lessening the efficiency of the apparatus. The tubes are loosely inserted into the cups $o$.

In the base part of the autoclave a stool $v$ is provided having perforated walls. This stool carries the charging vessel $l$. An annular space $z$ is provided between the charging vessel and the cylinder $a$.

A further modification of the charging and treating vessel is shown in Fig. 3.

Here the charging vessel consists of a plurality of preferably all sidedly closed trays 3 of which the walls may be perforated or not perforated; tubular open-end perforated members 2 are evenly distributed in said trays; the trays are superposed upon each other and spaces 4 are left between the individual trays.

This construction of the charging and treating vessel is particularly adapted for the devulcanisation of small-sized articles.

According to Fig. 4 the treating vessel consists of a plurality of perforated sections which are arranged in the autoclave in spaced relationship to each other and vertical passages 6 are formed between the individual sections.

My rubber reclaiming method is carried out by means of the above described apparatus in the following manner:

The top cover $d$ of the autoclave is opened and the charging vessel $l$ which has been previously filled with the waste rubber goods is inserted into the autoclave by means of chain $m$. The vessel $l$ is lowered into the autoclave until it rests on the stool $v$. As soon as the autoclave is tightly closed, high-pressure saturated steam is introduced into the autoclave by means of pipe $f$. The operating pressure is maintained at approximately 700 pounds per square inch. The treating temperature ranges accordingly at about 490° C. The time of treatment varies between 15 to 50 minutes.

The working condition and particularly the pressure of the steam and the duration of the treatment depend upon the character of the charged rubber goods; they may also be varied by removing some of the steam distributing tubes from the treating receptacle.

The steam enters from above the perforated tubes $p$ and into the annular space $z$. It flows through the tubes and the said space in a downward direction and enters in a substantially horizontal direction into the charge, as shown by arrows in Fig. 1.

In this manner a thoroughly uniform distribution of the steam is effected throughout the entire charge and each rubber article is acted upon by the steam on its entire surface. The steam, at the same time, has a kind of loosening action and prevents the premature clogging together of portions of the charge contrary to the customary methods, the great disadvantage of which consists in the uneven distribution of the steam and therein that due to the high-pressure of the steam portions of the charge are compressed and made impenetrable, the result being a partly incomplete devulcanisation of the rubber goods.

As soon as the treatment is terminated the cover $d$ is opened, the vessel $l$ is lifted from the autoclave and its contents emptied out and cooled at room temperature; the final product has a wholly uniform character and is a completely devulcanized rubber mass.

The invention is not restricted to the treatment of the waste rubber articles with high-pressure steam and other devulcanising agents, for instance gases or alkaline liquors may be used without departing from the spirit of the invention. In these cases it is advisable to externally heat the reaction receptacle by a steam-jacket or other suitable heating means.

I claim:

A method for reclaiming waste rubber comprising charging the unground rubber pieces in an autoclave, introducing high pressure steam at a pressure of approximately 700 lbs./sq. inches and at a temperature of approximately 490° C. into said autoclave through a plurality of substantially vertical evenly distributed unobstructed main flows, dividing-off from said vertical main flows substantially horizontal uniformly distributed secondary steam flows, introducing the steam only through the said secondary steam flows into the charge, subjecting the same hereby to the uniform action of the high pressure steam substantially on their entire surface, removing the treated charge from the autoclave and allowing the same to cool at room temperature.

JAKOB HIRSCHBERGER.